United States Patent [19]
Landin et al.

[11] Patent Number: 5,725,931
[45] Date of Patent: Mar. 10, 1998

[54] CONSTRAINED LAYER DAMPER WITH SLIT(S) AND/OR CUTOUT(S)

[75] Inventors: Donald T. Landin; Shwi-Long Hwang, both of Eagan, Minn.

[73] Assignee: Minnesota Mining and Manufacturing Company, St. Paul, Minn.

[21] Appl. No.: 552,392

[22] Filed: Nov. 3, 1995

[51] Int. Cl.[6] ............................. B32B 3/24; G11B 3/61
[52] U.S. Cl. .................. 428/134; 428/136; 428/137; 428/138; 428/64.1; 428/64.2; 428/64.3; 428/64.4; 428/65.3; 428/220; 74/443; 360/97.02; 360/135; 369/263; 369/283
[58] Field of Search .......................... 428/134, 136, 428/137, 138, 64.1, 64.2, 64.3, 64.4, 65.3, 220; 74/443; 360/97.02, 135; 369/263, 283

[56] References Cited

U.S. PATENT DOCUMENTS

| | | | |
|---|---|---|---|
| 2,556,925 | 6/1951 | Keller | 267/35 |
| 3,409,489 | 11/1968 | Renton | 156/60 |
| 3,843,188 | 10/1974 | Kirschner | 295/7 |
| 3,857,296 | 12/1974 | Tsunoda | 74/443 |
| 4,726,007 | 2/1988 | McCormack | 369/286 |
| 5,021,905 | 6/1991 | Sleger | 360/97.02 |
| 5,123,625 | 6/1992 | Spaltofski | 248/634 |
| 5,214,549 | 5/1993 | Balver et al. | 360/97.02 |
| 5,241,530 | 8/1993 | Kobayashi et al. | 369/264 |
| 5,256,223 | 10/1993 | Alberts et al. | 156/71 |
| 5,258,972 | 11/1993 | Brasyield et al. | 369/270 |
| 5,330,811 | 7/1994 | Buchalter | 428/40 |
| 5,335,463 | 8/1994 | Reinhall | 52/167 R |
| 5,458,940 | 10/1995 | Woo | 428/64.3 |
| 5,474,840 | 12/1995 | Lundin | 428/294 |
| 5,487,926 | 1/1996 | Kuribayashi et al. | 428/33 |
| 5,538,774 | 7/1996 | Landin et al. | 428/64.1 |

FOREIGN PATENT DOCUMENTS

| | | |
|---|---|---|
| 0 429 363 A1 | 11/1990 | European Pat. Off. |
| 507515A2 | 10/1992 | European Pat. Off. |
| 4029684 A1 | 8/1991 | Germany |
| 04195790 | 7/1992 | Japan |
| 07050053 | 2/1995 | Japan |
| 2 282 865 | 4/1995 | United Kingdom |

*Primary Examiner*—William Watkins
*Attorney, Agent, or Firm*—Janice L. Dowdall

[57] ABSTRACT

The present invention provides a constrained layer damper having slits and/or cutout(s) therein, which provides improved vibration damping performance. The constrained layer damper of the invention is useful, for example, for damping rotatable spacer articles and also rotatable storage media such as compact disks.

36 Claims, 9 Drawing Sheets

CONSTRAINED LAYER DAMPER WITH SLIT(S) AND/OR CUTOUT(S)

FIELD OF THE INVENTION

The present invention provides a constrained layer damper having slits and/or cutout(s) therein, which provides improved vibration damping performance. The constrained layer damper of the invention is useful, for example, for damping rotatable spacer articles and also rotatable storage media such as compact disks.

BACKGROUND OF THE INVENTION

Due to the vibration encountered in use, attempts have been made in the past to damp rotatable storage media such as compact disks. For example, U.S. Pat. No. 4,726,007 (McCormack) describes a damper, which is not a constrained layer damper, made of substantially rigid, sound absorbing and low-transmissive material which is shaped like a disk and which is mounted to lie in close contact with or be adhered to the top of the compact disk.

Constrained layer dampers have also been used to damp rotatable storage media. Constrained layer dampers are used by attaching the constrained layer damper to an outer surface of the article to be damped.

Constrained layer dampers have frequently been used which include a vibration damping material layer on a backing and include a central hole therein, but which do not include any slits or cutouts in the area of the damper between the central hole and the perimeter of the damper. See, for example, European Patent Application 0507515A2 (Woo).

Two types of constrained layer dampers which have particular shaped cutouts, in addition to a central hole, are known. These two types of dampers are both available from Combak Corporation located in Kanagawa, Japan under the trade names MY-T Tuning Sheet and Harmonix CD Treatment RF-11. These known dampers are illustrated in FIGS. 7 and 8, respectively. The known damper in FIG. 7 includes a central hole 70 and four projections 72 each having a rectangular shaped portion extending from the perimeter of the hole towards the perimeter of the damper. At the end of each rectangular portion is an off-center somewhat circular portion having a diameter greater than the width of the rectangular portion of the projection. The known damper in FIG. 8 includes a central hole 80 and four separate cutouts 82 positioned symmetrically about the hole in the center of the damper. Each cutout has the same shape which is that of a cross shaped feature which has off center somewhat circular portions positioned at each of the cross ends.

However, a need still exists for constrained layer dampers which can provide improved damping performance beyond that which is currently available with known constrained layer dampers.

SUMMARY OF THE INVENTION

Such a damper, having improved damping performance, has been discovered and is the subject of the present invention. The present invention provides a novel constrained layer damper which surprisingly displays superior damping properties compared to known constrained layer dampers.

A first embodiment of the damper of the present invention provides:
a damper comprising:
a construction comprising:
a layer(s) of vibration damping material attached to one side of a backing wherein the backing has a Young's Modulus greater than that of the layer(s) of vibration damping material;
wherein the construction has a hole passing through the center of the construction;
wherein the construction has a perimeter and the hole has a perimeter;
wherein the construction has at least one slit, each slit independently extending through the backing and optionally further extending through the vibration damping material layer(s), wherein the damper has improved vibration damping properties compared to an identical damper not having slit(s).

A preferred damper comprises:
a construction comprising:
a layer(s) of vibration damping material attached to one side of a backing wherein the backing has a Young's Modulus greater than that of the layer(s) of vibration damping material;
wherein the construction has a hole passing through the center of the construction;
wherein the construction has a perimeter and the hole has a perimeter;
wherein the construction has at least four slits, each slit independently extending through the backing and optionally further extending through the vibration damping material layer(s),
wherein each slit is of sufficient length and positioned such that each slit vector has a length at least 50% of the shortest distance from a point on the perimeter of the hole to a point on the perimeter of the construction.
wherein the damper construction can be centrally positioned in a four quadrant grid defined by two intersecting perpendicular straight lines such that at least one separate slit vector is present in each of the four quadrants.

A second embodiment of the damper of the present invention provides a damper comprising:
a construction comprising:
a layer(s) of vibration damping material attached to one side of a backing wherein the backing has a Young's Modulus greater than that of the layer(s) of vibration damping material;
wherein the construction has a perimeter;
wherein the construction has a hole passing through the center of the construction, wherein the perimeter of the hole is defined by the largest circle that can fit within the hole;
wherein one of (i) and (ii) is true: (i) the construction has at least one cutout therein, wherein each cutout independently extends through the backing and optionally through the vibration damping material layer(s), (ii) the construction has a combination of at least one cutout and at least one slit wherein each cutout independently extends through the backing and optionally further extends through the vibration damping material layer(s), and wherein each slit independently extends through the backing and optionally further extends through the vibration damping material layer(s);
wherein the damper has improved vibration damping properties compared to an identical damper not having slit(s) and cutout(s).

A preferred damper comprises:
a construction comprising:
a layer(s) of vibration damping material attached to one side of a backing wherein the backing has a Young's Modulus greater than that of the layer(s) of vibration damping material;
wherein the construction has a perimeter;
wherein the construction has a hole passing through the center of the construction, wherein the perimeter of the hole is defined by the largest circle that can fit within the hole;

wherein one of (i) and (ii) is true: (i) the construction has at least four cutouts therein, wherein at least one cutout has an internal angle of 90° or less, wherein each cutout independently extends through the backing and optionally through the vibration damping material layer(s), (ii) the construction has a combination of cutout(s) and slit(s) such that at least one cutout is present and at least one slit present and the total number of slit(s) and cutout(s) combined is at least four, wherein each cutout independently extends through the backing and optionally further extends through the vibration damping material layer(s), and wherein each slit independently extends through the backing and optionally further extends through the vibration damping material layer(s);

wherein each cutout is of sufficient dimensions and positioned such that each cutout vector has a length at least 50% of the shortest distance from a point on the perimeter of the hole to a point on the perimeter of the construction, wherein each slit is of sufficient length and positioned such that each slit vector has a length at least 50% of the shortest distance from a point on the perimeter of the hole to a point on the perimeter of the construction, wherein the damper construction can be centrally positioned in a four quadrant grid defined by two perpendicular intersecting straight lines such that at least one of the following is present in each quadrant: (i) a slit vector; (ii) a cutout vector.

Definitions of Terms

The term "slit" as used herein refers to an opening made in a material by cutting, for example, in which no material is removed in making the opening. This would include, for example, a straight line cut or slash made with a blade, for example, in a material. This would include, as another example, a curved cut or slash. Two or more slits that intersect are counted as one slit. For example, two perpendicular slits that intersect are counted as one slit.

Likewise, three slits that intersect would also be counted as one slit.

Two slits that do not intersect are counted as two separate slits. Likewise three slits that do not intersect are counted as three separate slits.

The term "cutout" as used herein refers to a hole made in a material in which at least some of the material is actually removed. This would include, for example, a rectangular cut, in which a rectangular section of material is actually removed from the material. A cutouts(s) that intersects with other cutouts and/or slit(s) is counted as one cutout. For example, a cutout that intersects with one slit will be counted as one cutout for purposes of this invention. In addition, two cutouts that intersect are counted as one cutout. Two cutouts that are joined by a slit that intersects with both cutouts will be counted as one cutout. In other words, the two cutout/slit combination is counted as one cutout. However, two cutouts and one slit that do not intersect with each other at all, will be counted as two cutouts and one slit.

The term "rotatable article" as used herein includes "rotatable storage articles" and "rotatable spacer articles".

The term "rotatable spacer article" as used herein refers to a mechanical coupling device which can be used to couple rotatable storage articles and a spindle motor hub of a hard disk drive. Examples of rotatable spacer articles include disk spacers, etc. The term "rotatable storage article" as used herein refers to a media that has information stored on it and/or which is capable of storing information. The article is typically capable of being rotated in some manner that allows the data stored on the article to be passed by a read or write element to allow reading of information from the article, or writing of information on the article, or both. Examples of rotatable storage articles include rigid disk drive disks, optical disks, compact disks (CDs), magneto-optical disks, records, drums, floppy disks, and the like.

DETAILED DESCRIPTION OF THE INVENTION

Figure 1:
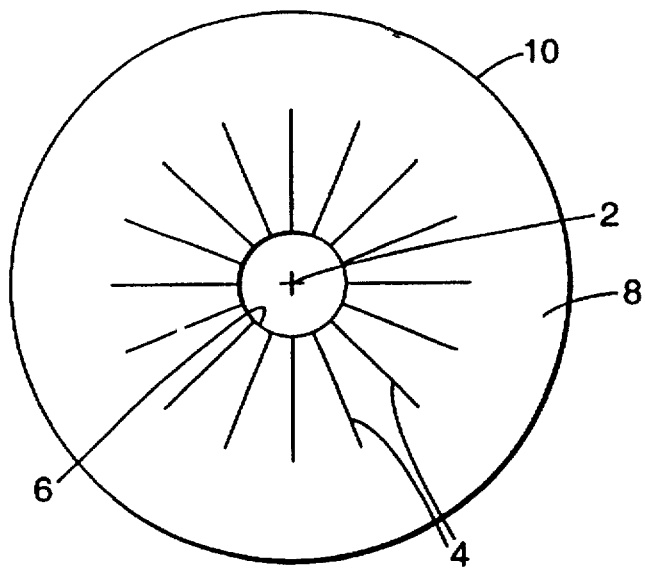
FIG. 1 illustrates a top plan view of one embodiment of a damper of the invention.

The present invention provides novel constrained layer dampers as well as rotatable storage media and rotatable spacer articles having the dampers applied thereto.

Rotatable storage media can be prepared from structural materials including but not limited to those selected from the group consisting of metals, e.g., aluminum and aluminum alloys; plastics, e.g., polyester and polycarbonate; ceramic; glass; and/or vinyl. Compact disks for example are made of a plastic substrate such as polycarbonate which can be coated with additional layers such as aluminum reflective coatings and clear protective coatings.

Rotatable spacer articles such as disk spacers are typically made of materials similar to those used for the rotatable storage media, i.e., metals, plastics, ceramics, and vinyl but do not contain recording layers.

Vibration Damping Material Layer(s)

A variety of damping materials may be used in the constrained layer dampers of the invention. A vibration damping material layer may be continuous or discontinuous. A continuous vibration damping material layer may comprise one type of damping material or may comprise adjacent sections of different vibration damping materials, for example. A discontinuous layer may comprise sections of damping material separated by non-damping material(s) or space(s) for example. In addition when at least two damping layers are present each layer may comprise damping material(s) of the same or different chemical compositions. Preferably, the backing is substantially covered with a continuous layer(s) of damping material, although the layer (s) may be discontinuous.

The vibration damping material comprises a viscoelastic material. A viscoelastic material is one that is viscous, and therefore capable of dissipating energy, yet exhibits certain elastic properties, and therefore capable of storing energy at the desired temperature and frequency range. That is, a viscoelastic material is an elastomeric material typically containing long-chain molecules that can convert mechanical energy into heat when they are deformed. Such a material typically can be deformed, e.g., stretched, by an applied load and gradually regain its original shape, e.g., contract, sometime after the load has been removed.

Suitable viscoelastic materials for use in the vibration damping materials useful in the present invention have a shear storage modulus G', i.e., measure of the energy stored during deformation, of at least about 1 psi (6.9×10$^3$ Pascals) at the operating temperature and frequency (typically about −40° C. to 100° C. and about 1 Hz to 10,000 Hz). The storage modulus of useful viscoelastic materials can be as high as 500,000 psi (3.45×10$^9$ Pascals); however, typically it is about 10 to 2000 psi (6.9×10$^4$ to 1.4×10$^7$ Pascals). Particularly preferred viscoelastic materials provide the damped rotatable article with a strain energy ratio, i.e., fraction of strain energy stored in the damping material relative to the total strain energy stored in the damped rotatable article, of at least about 2%.

Suitable viscoelastic materials, at the operating temperature and frequency, for use in the vibration damping materials used in the present invention have a loss factor, i.e., the ratio of energy loss to energy storage or the ratio of the shear loss modulus G" to shear storage modulus G', of at least about 0.01. Preferably the loss factor is at least about 0.5, more preferably greater than about 0.5 to 10, and most preferably 1 to 10, at the operating frequency and temperature experienced by the material. This loss factor represents a measure of the energy dissipation of the material and depends on the frequency and temperature experienced by the damping material. For example, for 3M ISD 110 available from Minnesota Mining and Manufacturing Company (3M), a crosslinked acrylic polymer, at a frequency of 100 Hz, the loss factor at 68° F. (20° C.) is about 1.0, while at 158° F. (70° C.) the loss factor is about 0.7.

Useful vibration damping materials can be isotropic as well as anisotropic materials, particularly with respect to their elastic properties. As used herein, an "anisotropic material" or "nonisotropic material" is one in which the properties are dependent upon the direction of measurement. Suitable materials having viscoelastic properties include but are not limited to those selected from the group consisting of urethane rubbers, silicone rubbers, nitrile rubbers, butyl rubbers, acrylic rubbers, natural rubbers, styrene-butadiene rubbers, and the like. Other useful damping materials include but are not limited to those selected from the group consisting of polyesters, polyurethanes, polyamides, ethylene-vinyl acetate copolymers, polyvinyl butyral, polyvinyl butyral-polyvinyl acetate copolymers, epoxy-acrylate interpenetrating networks and the like. Thermoplastics and thermosetting resins suitable for use as vibration damping material may also be utilized in the manufacture of the dampers.

Useful vibration damping materials can also be crosslinkable to enhance their strength, high temperature integrity, and processability. Such materials are classified as thermosetting resins. When the viscoelastic material is a thermosetting resin, then prior to the manufacture of the damper, the thermosetting resin is typically in a thermoplastic state. During the manufacturing process, the thermosetting resin can be further cured and/or crosslinked typically to a solid state, although it could be a gel upon curing as long as the cured material possesses the viscoelastic properties described above. Depending upon the particular thermosetting resin employed, the thermosetting resin can include a curing agent, e.g., catalyst, which when exposed to an appropriate energy source (such as thermal energy) initiates the polymerization of the thermosetting resin.

As indicated above, the vibration damping material useful herein may be crosslinked. A crosslinked vibration damping material has the following advantages: it provides mechanical integrity at elevated temperatures and high stress levels that may be experienced during use (high rotations per minute (RPMs), such as 5,000 RPMs or above, for example) which can generate stresses. Preferred materials are acrylates, epoxies, silicones, and blends, copolymers, or interpenetrating networks thereof, more preferred materials are acrylates, epoxy/acrylates, and silicone/acrylates, and most preferred materials are acrylates and epoxy/acrylates. Examples of useful crosslinking agents include but are not limited to those selected from the group consisting of diacrylates, triacrylates, triazines, and the like. The vibration damping material typically further comprises about 0 to about 2 percent by weight of a crosslinking agent based upon the total weight of viscoelastic polymer, preferably about 0.04 to about 0.5 percent by weight, and most preferably about 0.1 to about 0.25 percent by weight.

In general, any suitable viscoelastic material can be used in the present invention. The choice of viscoelastic material for a particular set of conditions, e.g., temperature and frequency of vibration, etc., is within the knowledge of one of skill in the art of vibration damping. The selection of a suitable damping material is also based on the processability of the damping material (cutting or other fabricating) and the desired integrity of the finished damper construction with the damping material selected. It is to be understood that blends of any of the foregoing materials can also be used.

In addition to the viscoelastic material, the vibration damping material of the present invention may include an effective amount of a fibrous and/or particulate material. Herein, an "effective amount" of a fibrous material and/or particulate is an amount sufficient to impart at least improvement in desirable characteristics to the viscoelastic material. Generally, the fibrous and/or particulate material is used in an amount effective to increase the strain energy ratio of a damper containing the same amount and type of viscoelastic material without the fibrous or particulate material. Typically, the amount of the fibrous material in the viscoelastic material is within a range of about 3–60 wt %, preferably about 10 to about 50 wt %, more preferably about 15 to about 45 wt %, based on the total weight of the vibration damping material. Typically, the amount of the particulate material in the viscoelastic material is within a range of about 0.5–70 wt %, preferably 1 to 45 wt %, more preferably 5 to 40 wt %, and most preferably about 5 to 30 wt %, based on the total weight of the vibration damping material.

The fibrous material can be in the form of fibrous strands or in the form of a fiber mat or web, although fibrous strands are preferred. The fibrous strands can be in the form of threads, cords, yarns, rovings, filaments, etc., as long as the viscoelastic can wet the surface of the material. They can be dispersed randomly or uniformly in a specified order. Examples of useful fibrous materials include metallic fibrous materials, such as aluminum oxide, magnesium, or steel fibers, nonmetallic fibrous materials, such as fiberglass, natural organic fibrous materials such as wool, silk, cotton, and cellulose and synthetic organic fibrous materials such as polyvinyl alcohol, nylon, polyester, rayon, polyamide, acrylic, polyolefin, aramid, and phenol.

The particulate material useful in the invention can be in the form of nodules, bubbles, beads, flakes, or powder, as long as the viscoelastic material can wet the surface of the particulate. The particulate material can vary in size, but should not typically be greater than the thickness of the damping material layer.

Examples of useful particulate materials include coated or uncoated glass and ceramic bubbles or beads such as thermally conductive bubbles, powders such as aluminum oxide powder and aluminum nitride powder, silica, metal flakes such as copper flakes, cured epoxy nodules, and the like.

In addition to fibers and particulate material, the vibration damping material of the present invention can include additives such as fillers (e.g. talc, etc.), colorants, toughening agents, fire retardants, antioxidants, antistatic agents, and the like. Sufficient amounts of each of these materials can be used to produce the desired result.

Combinations of fibrous material and particulate material would also be useful and would be used in the range of about 0.5 to about 70 weight percent based on the total weight of the vibration damping material.

The thickness of the vibration damping material layer(s) can vary. The thickness of the layer is dependent upon a number of factors such as the type of vibration damping material selected and the anticipated end use of the damper of the invention. Typically, the total thickness of the layer(s) ranges from about 0.5 to about 30 mils (0.013 to 0.76 mm), preferably about 1 to about 10 mils (0.025 to 0.25 mm), and most preferably about 2 to about 5 mils (0.051 to about 0.127 mm).

Typically the total thickness of the vibration damping material layer(s) is less than the thickness of the backing.

Backing

Any backing material which is typically used in constrained layer dampers can be used as an element of the damper of the present invention. Examples of useful backing materials include but are not limited to those selected from the group consisting of paper, metals, polymeric materials, fiber-reinforced polymeric materials, and combinations thereof. The backing may, for example, be a laminate of multiple layers. Useful polymeric materials include but are not limited to those selected from the group consisting of polystyrene, polyester, polyvinyl chloride, polyurethane, polycarbonate, polyimide, polyethylene, and polypropylene. Preferably the backing has a Young's Modulus of at least about $1 \times 10^8$ Pascals.

As indicated previously the backing should have a Young's Modulus greater than that of the vibration damping material layer. Preferably, the backing has a Young's Modulus of at least about 10 times greater than that of the vibration damping material, more preferably at least about 100 times greater, most preferably at least about 1000 times greater. For optimal damping, the backing should have a stiffness approximately equal to the stiffness of the article being damped. For some uses, the thickness of the backing will need to be limited due to size and/or weight limitations necessitated by the rotatable article to be damped or the location where the article is to be used. In general, the backing stiffness is related to the thickness of the backing. For a given backing material, the bending stiffness increases as the thickness of the backing increases. Thus, the desired stiffness of the backing can be varied by adjusting the thickness depending on the modulus of the backing. The backing typically has a thickness of greater than about 0.5 mils (0.013 mm), preferably greater than about 1.0 mil (0.025 mm), and most preferably, greater than about 2.0 mils (0.051 mm). The backing may further comprise an additive such as these selected from the group consisting of fire retardants, colorants, antistatic agents, etc. The backing may carry indicia such as product identification, bar code, and/or application instructions.

Slits and/or Cutouts

Slits

As indicated previously one embodiment of the damper of the invention has at least one slit as long as the requisite improved damping occurs. The slits(s) should be of sufficient length and positioned such that the damper has improved damping performance compared to an identical damper without the slit(s). The damping ability would be measured via the damping test set forth below. Preferably, the damper has at least four slits. Preferably the damper of the invention has eight to 64 slits, most preferably about 20 to about 64 slits. If the damper has less than four slits damping performance may not be improved as much. Typically, the greater the number of slits the greater the vibration damping performance of the damper. If the damper has a very large number of slits difficulties may arise when applying the damper to the object it is intended to damp since the large number of slits could make the damper unwieldy and difficult to smoothly apply to a rotatable storage medium such as a CD, for example.

Preferably for each slit one of the following is true: (i) the slit intersects with the perimeter of the hole (ii) the slit intersects with the perimeter of the construction (iii) the slit intersects with neither the perimeter of the hole nor the perimeter of the construction.

When at least four slits are present the slits are preferably positioned such that at least one slit vector is present in each of the four quadrants when the damper is centrally positioned over a four quadrant grid. The four quadrant grid is defined by the intersection of two perpendicular straight lines. By "centrally positioned" it is meant that the center of the centrally positioned hole is positioned over the center of the grid.

For FIGS. 9-12, discussed herein, the slits have been selected such that they are straight and each fall along a radius of the damper. Thus each slit has the same shape and position as its corresponding slit vector.

Figure 9:
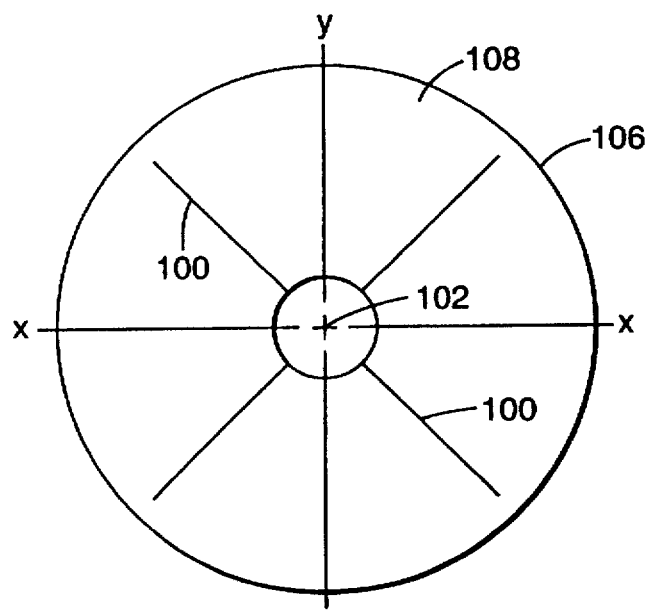
FIG. 9 illustrates a top plan view of a damper of the invention positioned on a grid.

FIG. 9 illustrates a damper of the invention having a damper perimeter 106, a backing 108, four slits 100 (and corresponding slit vectors) and a central circular hole 102. Each slit 100 (and corresponding slit vector) is positioned in a separate quadrant in the grid defined by the perpendicular intersection of lines x and y.

Figure 10:
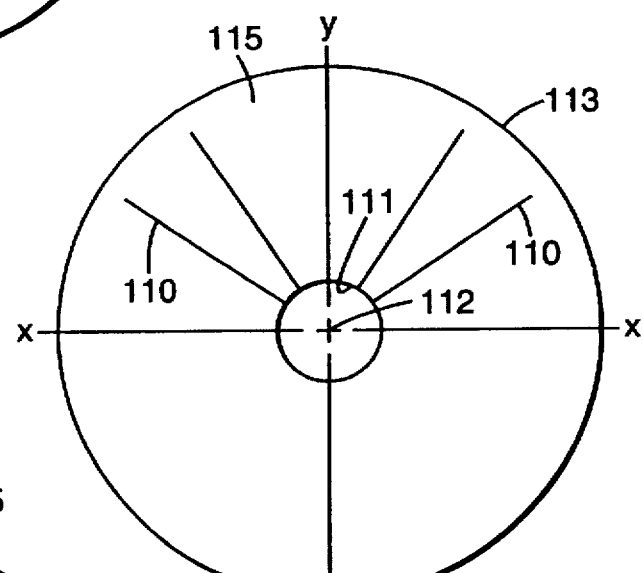
FIG. 10 illustrates a top plan view of another embodiment of a damper of the invention positioned on a grid.

FIG. 10, however, illustrates a useful but less preferred damper of the invention having a backing 115, a damper perimeter 113, slits 110 (and corresponding slit vectors), central hole 112, and a hole perimeter 111. Note that all four slits 110 (and corresponding slit vectors) fall within two quadrants instead of being spaced among the four quadrants.

Figure 11:
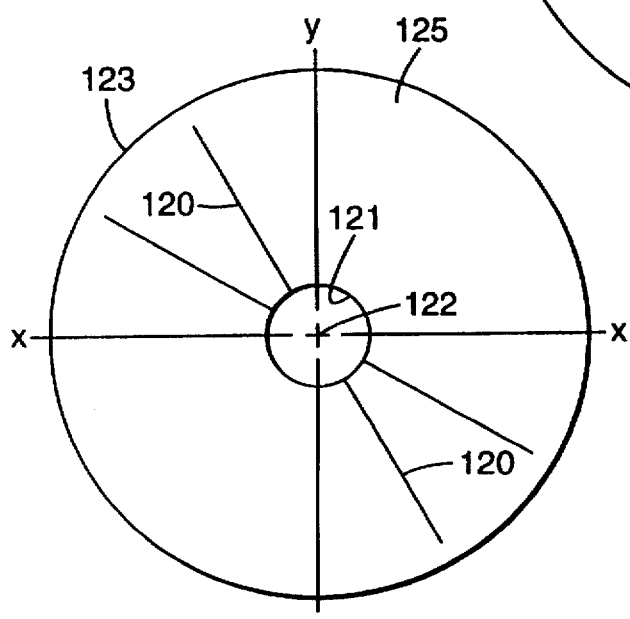
FIG. 11 illustrates a top plan view of a damper of the invention positioned on a grid.

FIG. 11 illustrates a damper of the invention having a damper perimeter 123, a backing 125, four slits 120 (and corresponding slit vectors), a central hole 122, and a hole perimeter 121. On first glance it may appear that the at least one slit 120 (and corresponding slit vector) does not fall within each quadrant.

Figure 12:
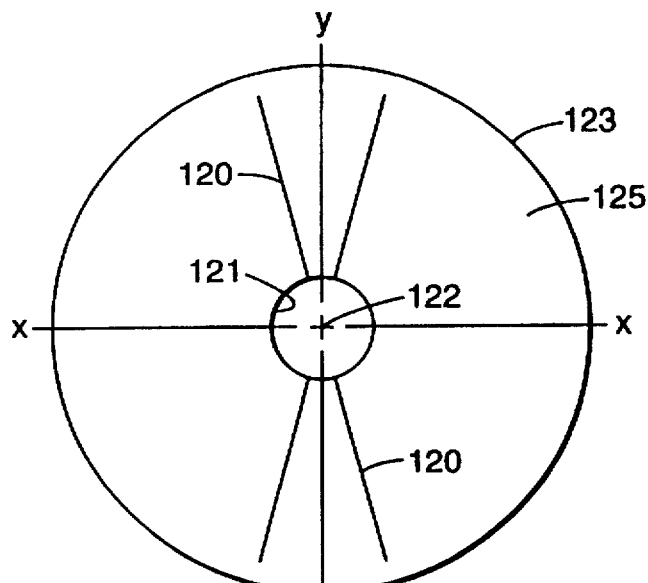
FIG. 12 illustrates a top plan view of the damper of FIG. 11 positioned differently on a grid.

However, as FIG. 12 illustrates, the damper of FIG. 11 if rotated about the center point of the intersecting lines making up the grid can actually be positioned such that at least one slit 120 (and corresponding slit vector) falls in each quadrant. In fulfilling this requirement of a preferred embodiment that at least one slit vector be present in each quadrant, it is acceptable to rotate the damper around the center point of the quadrant if by doing so, one obtains a situation where at least one slit vector is present in each quadrant.

Note also, that no amount of rotation of the damper of FIG. 10 will result in a situation where at least one slit vector 110 is present in each quadrant. Preferably, the slits (and corresponding slit vectors) are symmetrically positioned with respect to the central hole in the damper. Preferably, the slits (and corresponding slit vectors) are equidistantly positioned with respect to each other.

The slits in the damper can have a variety of shapes. Examples of suitable shapes include, but are not limited to those selected from the group consisting of: (i) straight line segments, (ii) curved line segments, (iii) combinations of straight line segments, (iv) combinations of curved line segments, and (v) combinations of straight line segment(s) and curved line segment(s). Preferably, the slits are straight line segments for ease of manufacturing. Preferably, the slits are straight line segments which each extend along a separate radius of the construction.

Some slits may have a fairly great length but would not cover much distance due to their zigzag or curved configuration, for example. In addition, some slits may have a fairly great length but may be positioned more or less sideways with respect to the central hole of the damper so that they do not cover as much distance from the central hole to the perimeter of the damper if they were positioned more or less in a radial fashion with respect to the central hole.

Preferably the slits are positioned such that each slit extends in a direction from the vicinity of the perimeter of the hole to the vicinity of the perimeter of the construction. In order to provide a more accurate measure of the total distance from the vicinity of the hole perimeter to the vicinity of the damper perimeter covered by the slit a determination is made of a "slit vector" (SV).

Figure 14:
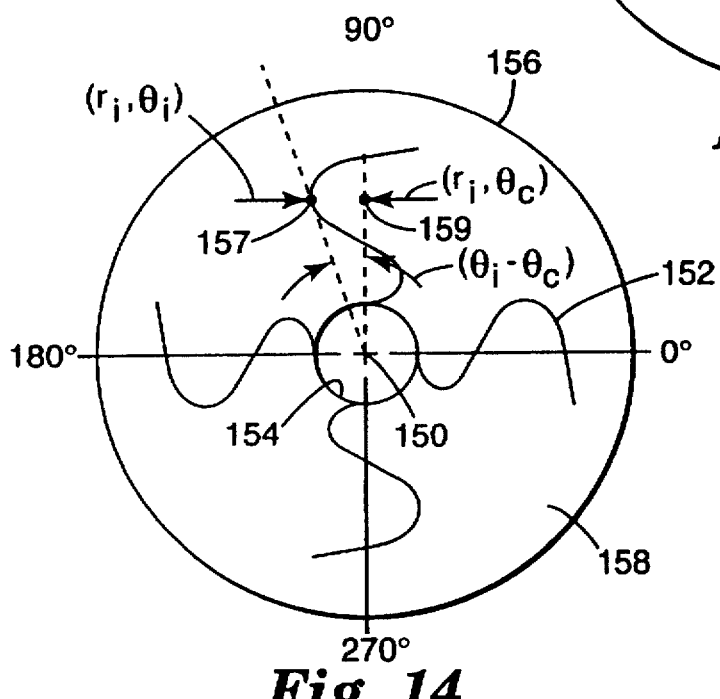
FIG. 14 illustrates a top plan view of a damper of the invention having four slits which is used to demonstrate how the slit vector length is determined.
Figure 16:
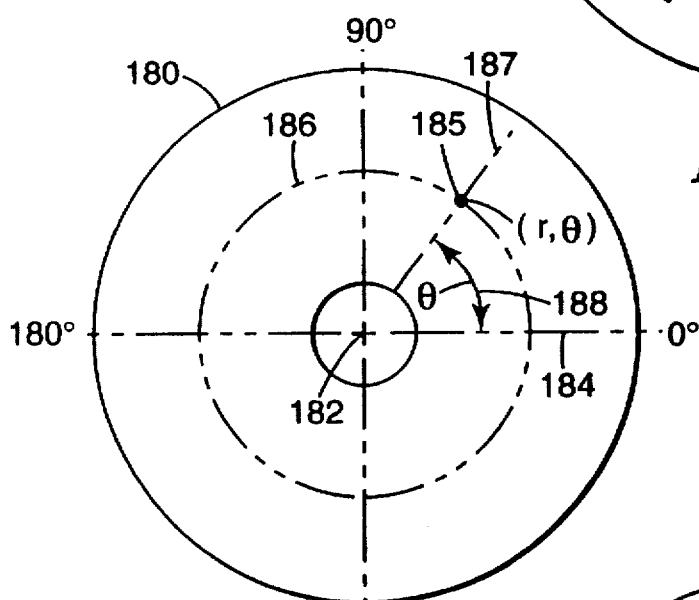
FIG. 16 illustrates a top plan view of a damper showing how a point on a damper can be defined by polar coordinates.

The SV is a straight line which extends in a radial direction from the hole perimeter to the damper perimeter. It is most convenient to express its position in terms of polar coordinates instead of the more commonly used rectangular coordinates. Whereas rectangular coordinates "x" and "y" locate a point "P" in the plane as an intersection of a vertical line and a horizontal line, polar coordinates locate a point "P" as the intersection of a circle and a ray from the center of that circle. These coordinates are defined as follows as shown in FIG. 16. Select a point 182 in the plane and a ray 184 emanating from this point. The point 182 is called the pole, and the ray 184 is called the polar axis. A point 185 in the plane lies on the intersection of a unique circle 186 whose center is the pole and a unique ray 187 emanating from the pole. If the circle has a radius "r" and the ray makes an angle "θ" 188 with the polar axis, then the point 185 is denoted by (r, θ). In terms of polar coordinates, the SV is a straight line with constant angle θ. The SV for any particular slit can be determined according to the method used in determining the slit vector for FIG. 14. FIG. 14 illustrates a damper which has backing 158 which has four curved slits 152, centrally located hole 150, hole perimeter 154, and damper perimeter 156. To determine an SV for a randomly shaped slit, the "least squares method" is used to determine the line (with constant θ) which best fits the points on the slit. This is done by minimizing the sum of the squares of the distances between the points on the slit and their corresponding points along the SV which are normal to the points. For instance, in FIG. 14 the distance from the point 157 on the slit to the corresponding point 159 on the SV is given by the equation $$Distance = r_i \sin(\theta_i - \theta_c)$$

The least squares method minimizes the sum of the squares of the distances between all the points on the slit and their corresponding point on the SV or $$\text{Minimize } \sum_{i=1}^{N} [r_i \sin(\theta_i - \theta_c)]^2$$

This will be a minimum when the first derivative equals zero or $$\frac{\partial}{\partial \theta_c} \sum_{i=1}^{N} [r_i \sin(\theta_i - \theta_c)]^2 = -2 \sum_{i=1}^{N} r_i^2 \cos(\theta_i - \theta_c)\sin(\theta_i - \theta_c) = 0$$

Applying trigonometry identities and solving for the constant angle provides $$\theta_c = \frac{1}{2} \tan^{-1}\left[\frac{\sum_{i=1}^{N} r_i^2 \sin 2\theta}{\sum_{i=1}^{N} r_i^2 \cos 2\theta}\right]$$

The SV is the line which extends from the point $(r_1, \theta_c)$ to the point $(r_N, \theta_c)$ where $r_1$ is the minimum r value of any point on the slit and $r_N$ is the maximum r value of any point on the slit. Thus any shape slit can be represented by a straight line extending from the point $(r_1, \theta_c)$ to the point $(r_N, \theta_c)$.

Preferably, each slit vector is of sufficient length and positioned such that it extends at least 50% of the shortest distance from a point on the perimeter of the central hole to a point on the perimeter of the construction. Most preferably, each slit vector is of sufficient length and positioned such that it extends at least 90% of the shortest distance from a point on the perimeter of the hole to a point on the perimeter of the construction.

Cutouts

Another embodiment of the damper of the invention is that having at least one cutout and optionally at least one slit wherein the improved damping performance previously mentioned is achieved. A preferred embodiment of the damper of the invention is that wherein the total number of cutouts plus slits is at least four, wherein at least one cutout and optionally at least one slit must be present. For example, the damper may have one cutout and three slits. As another example the damper may have three cutouts and two slits. The damper may have, as another example, six cutouts and no slits. The damper may have four cutouts and four slits, as another example. The damper may have eight cutouts and four slits, as another example.

Preferably for each slit present one of the following is true: (i) the slit intersects with the perimeter of the hole, (ii) the slit intersects with the perimeter of the construction,(iii) the slits intersects with neither the perimeter of the hole nor the perimeter of the construction. Preferably for each cutout one of the following is true; (i) the cutout intersects with the perimeter of the hole, (ii) the cutout intersects with the perimeter of the construction, (iii) the cutout intersects with neither the perimeter of the hole nor the perimeter of the construction.

Preferably, the damper of the invention which has at least one cutout and optionally at least one slit has four to 32 slits plus cutouts total, most preferably about 8 to about 16 slits plus cutouts total. If the damper has less than four slits plus cutouts total damping performance may not be sufficiently improved.

Typically, the greater the number of slits the greater the vibration damping performance of the damper. Also, typically, up to a point, the greater the number of cutouts the greater the vibration damping performance of the damper. Also, typically the greater the total number of slits plus cutouts the greater the vibration damping performance of the damper. However, at a certain point the number of cutouts is increased to a point where so much vibration damping material has been removed that there is no longer an improvement in vibration damping properties. In order to provide the best damping performance one would want to maximize the number of cutouts and the cutout vector length while minimizing the total amount of damping material removed providing the cutouts. Slits, however are preferred over cutouts in terms of damping performance since no damping material is removed in providing the slits.

Preferably, the cutout(s) and optional slit(s) are symmetrically positioned with respect to the central hole in the damper. Preferably, the cutouts and optional slits are equidistantly positioned with respect to each other. The cutout(s) and optional slit(s) in the damper can have a variety of shapes. They can be symmetrical or asymmetrical. Preferably the cutout(s) and slit(s) are symmetrical.

Preferably each cutout has at least one internal angle of 90 degrees or less, more preferably at least two, and most preferably at least three. Preferably at least one internal angle of 90 degrees or less is closer to the perimeter of the damper than the perimeter of the hole. Cutouts having at least one interior angle of 90 degrees or less appear to provide superior damping properties as compared to cutouts not having such interior angle(s). Examples of useful cutout shapes include but are not limited to those selected from the group consisting of rectangular, triangular, diamond, elliptical, circular, crescent-shaped cutouts and combinations thereof. Preferably, the cutouts have a shape selected from the group consisting of triangular and rectangular shapes for reasons of better damping performance. Each cutout can be of a same or different size as long as the total amount of vibration damping material removed is not such that there is no longer an improvement in vibration damping properties. Preferably, each cutout is of the same size. Each cutout can be of the same or different shape. Angular shaped cutouts such as rectangular, square, and triangular are preferred because of their better damping performance.

The area of each cutout can vary. Preferably each cutout has the cutout vector length discussed previously. Preferably, the area of each cutout is as small as possible as long as the cutout has the cutout vector length discussed previously. The total area of the cutouts preferably should not exceed 20% of the total area of the damper excluding cutouts, preferably not more than 10%, and most preferably not more than 5% for optimum damping performance, processability, and handleability. Preferably each cutout extends along a separate radius of the construction of a circular damper.

The slits that may optionally be used in combination with the cutouts may be of the same nature, location, etc. as those slits discussed above in the damper embodiment that contains slits only.

In order to provide a more accurate measure of the total distance from the vicinity of a point on the hole perimeter to the vicinity of a point on the damper perimeter covered by the cutout, a determination may be made of a "cutout vector".

Figure 15:
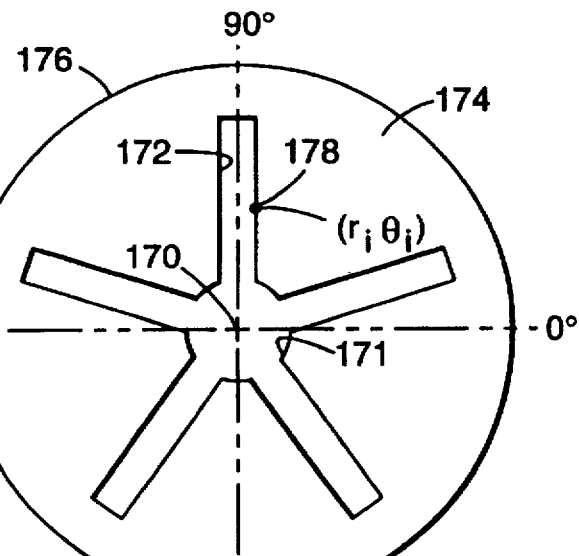
FIG. 15 illustrates a top plan view of a damper of the invention having five rectangular shaped cutouts which is used to demonstrate how the cutout vector length is determined

The "cutout vector" for any particular cutout can be calculated as follows: FIG. 15 illustrates a damper of the invention having a damper perimeter 176, backing 174, hole 170, defined by hole perimeter 171, and five symmetrically positioned cutouts 172. As shown in FIG. 15, the shape of any cutout can be given by the points on its perimeter. Each point (e.g. 178) will have unique coordinates $(r_i, \theta_i)$. A line can be constructed which represents the cutout. This representative slit is made up of points with the coordinates $(r_i,$ avg. $\theta_i)$ where $r_i$ is an r value of at least one point along the perimeter of the cutout and avg $\theta$ is the average $\theta$ value for all points along the cutout perimeter which have an r value of $r_i$.

Figure 17:
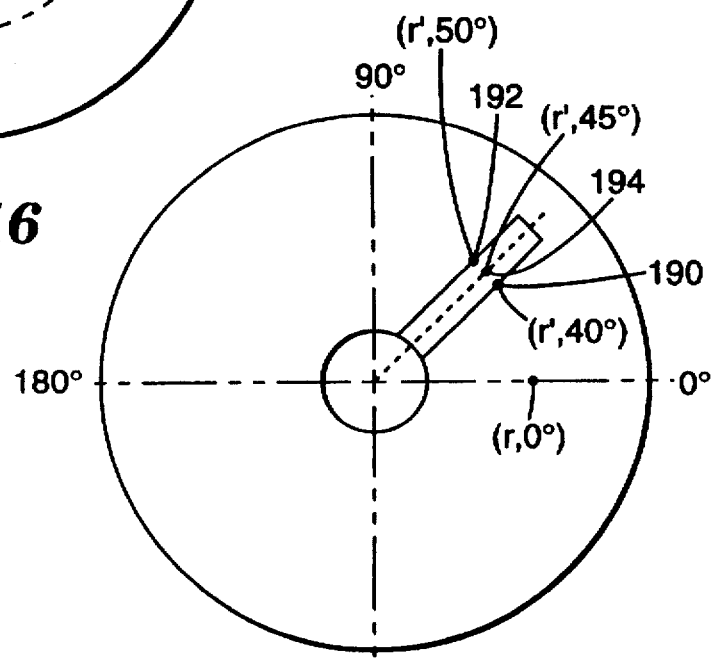
FIG. 17 illustrates a top plan view of a damper showing how a cutout is first reduced to a representative line in determining the cutout vector.

In FIG. 17, there are two points along the cutout perimeter with the r coordinate equal to r'. One point 190 has the coordinates (r', 40 deg.) and the other point 192 (r', 50 deg.). The coordinates of the corresponding point 194 on the representative line will be (r', 45 deg). In this way, the representative line can be constructed.

Figure 18:
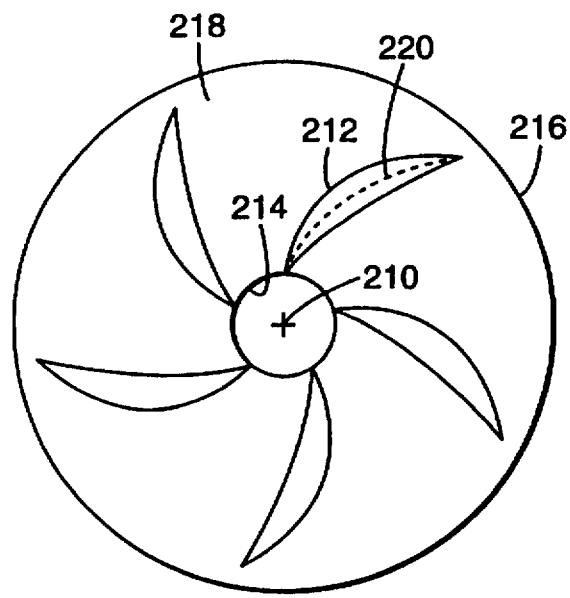
FIG. 18 illustrates a top plan view of a damper of the invention having five cutouts which is used to illustrate the first step in determining a cutout vector for a cutout. This step includes reducing each cutout to a representative line.

FIG. 18 illustrates a damper of the invention having damper perimeter 216, backing 218, central hole 210, hole perimeter 214, and crescent shape cutouts 212. FIG. 18 illustrates the representative line 220 for a cutout 212. A cutout vector can then be determined from the representative line 220 by using the same technique described earlier in going from a slit to a slit vector.

Figure 19:
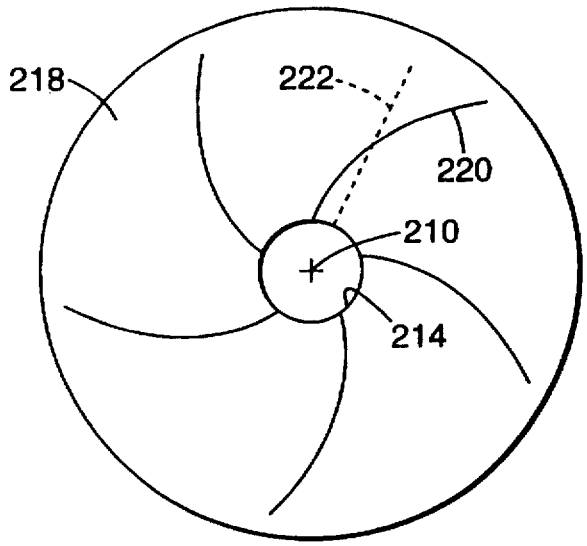
FIG. 19 illustrates a top plan view of the damper of FIG. 18, wherein one of the representative lines has been reduced to a cutout vector which is the second step in determining a cutout vector. This step includes calculating a cutout vector for each representative line after the first step of reducing each cutout to a representative line.

FIG. 19 shows the representative lines for the cutouts of the damper of FIG. 18 and the determination of one of the cutout vectors 222.

Figure 20:
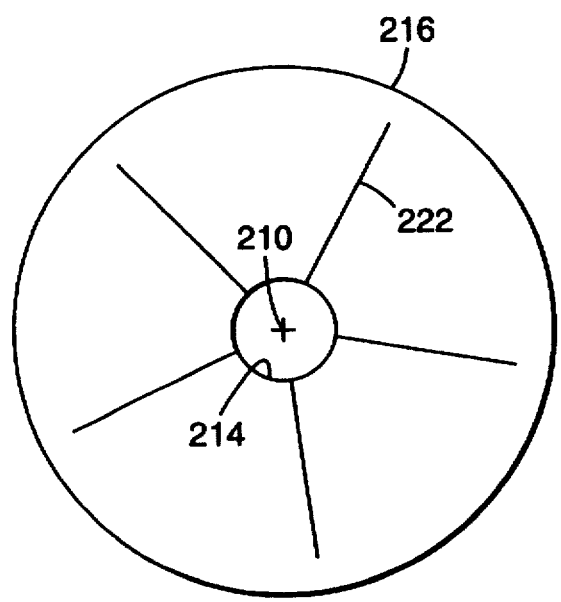
FIG. 20 illustrates a top plan view of the damper of FIG. 18 wherein all of the cutouts have been reduced to their respective cutout vectors.

FIG. 20 shows all of the cutout vectors for the cutouts 212 of the damper of FIG. 18.

Figure 21:
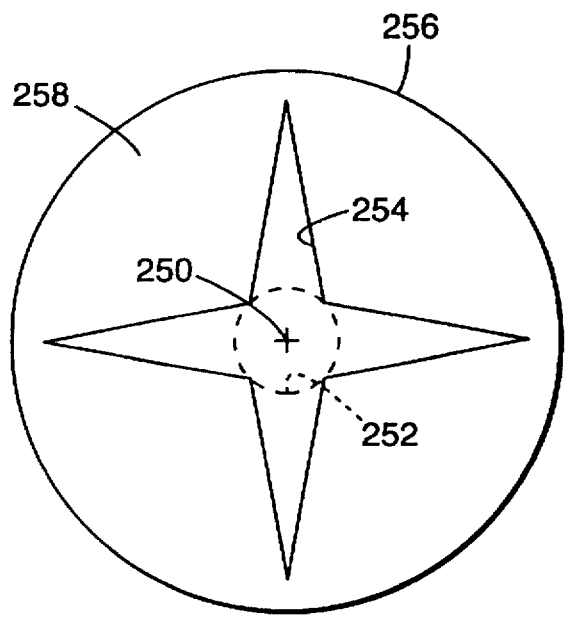
FIG. 21 illustrates a top plan view of another embodiment of the damper of the invention.

FIG. 21 illustrates a damper of the invention having a damper perimeter 256, a backing 258, cutouts 254, and a central circular hole 250 defined by circular hole perimeter 252.

Figure 22:
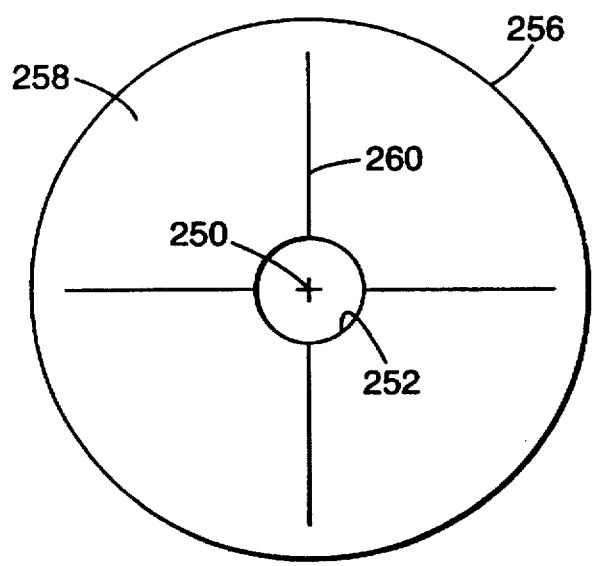
FIG. 22 illustrates cutout vectors for the damper of FIG. 21.

FIG. 22 is an illustration of the damper of FIG. 21 wherein the cutouts 254 have been reduced to representative lines 260. Representative lines 260 correspond to the cutout vectors due to the symmetry of the cutouts shown in FIG. 22.

Preferably, each cutout vector is of sufficient length that it extends at least 50% of the shortest distance from a point on the perimeter of the central hole to a point on the perimeter of the construction and more preferably at least 75%. Most preferably, each cutout vector is of sufficient length that it extends at least 90% of the shortest distance from a point on the perimeter of the hole to a point on the perimeter of the construction.

Damper Shape

The damper of the invention can have a variety of shapes. It can be symmetrical or asymmetrical. Preferably, it is symmetrical for ease of manufacture and in order to provide more uniform damping properties. Preferably, the article of the invention has the same shape or approximately the same shape as the article to be damped. Examples of suitable shapes include but are not limited to circles, ellipses, polygons such as triangles, rectangles, pentagons, hexagons, heptagons, octagons, etc. Since most rotatable storage articles are circular, it is preferred that the damper have a circular shape. As mentioned previously, a centrally located hole extends through the damper construction (i.e. through the backing and vibration damping material layer(s) and any optional layers which make up the damper construction. The size of the centrally located hole can vary. The purpose of the hole is to allow access to the central portion of the rotatable storage article to which the damper construction may be attached. The area of the hole is defined by the largest circle that will fit within the central hole. If the hole is itself circular then the perimeter of the circle defines the hole perimeter and encompasses the hole area. However, if the central hole is elliptical, for example, or of irregular shape, for example, the area of the hole is defined by the largest circle that will fit within the hole. The area outside this circle in the center of an elliptical hole, would be considered to be part of the cutout(s) surrounding the hole.

The centrally positioned hole in the damper can have a variety of shapes also. It can be symmetrical or asymmetrical. Preferably, it is symmetrical. Examples of suitable hole shapes include but are not limited to those selected from the group consisting of circles, ellipses, polygons such as triangles, rectangles, pentagons, hexagons, heptagons, octagons, etc. Preferably the hole has a circular shape.

Optional Damper Components

As indicated previously the damper of the invention comprises a construction comprising a vibration damping material layer(s) attached to one side of a backing, the construction having a centrally located hole in addition to slit(s) and/or cutout(s). The damper may optionally further comprise one or more of the following additional layers: a high-modulus adhesive such as an acrylic adhesive or epoxy adhesive to bond the damper to a rotatable storage article or spacer, a primer layer to improve adhesion between the backing and the vibration damping material layer, an anti-static layer, a wear-resistant layer, a printable layer, and the like. The damper may comprise more than one vibration damping material layer. Heat and/or pressure and/or adhesive may be used to bond the layers together, for example. Such optional layers would typically be positioned on the backing layer surface not in contact with the vibration damping layer or in between the backing and the vibration damping layer. The optional layers may or may not have slits.

As previously mentioned, the damper of the invention optionally further comprises a layer of adhesive, typically a pressure sensitive adhesive, on the surface of the vibration damping material layer opposite of the surface to which the backing is attached. The layer of adhesive can be used to attach the damper to a rotatable storage device. The layer of adhesive may have a release liner such as a silicone coated release liner attached to the adhesive layer to protect the adhesive prior to attachment of the damper to the rotatable storage device. One skilled in the art would be able to select suitable adhesives and release liners for such a purpose.

The damper layers (the backing layer, vibration damping material layer, etc.) of the damper are typically flat and thus the damper itself is typically flat. Optionally, however, the damper may be shaped such that the perimeter of the damper forms an angular ridge (typically perpendicular) such that the ridge extends in a direction away from the backing and towards the damping material layer(s). This ridge is also referred to herein as a "rib edge".

The present invention will be better understood by referring to the following figures.

FIG. 1 illustrates a damper of the invention having a central circular hole 2 and eighteen slits 4 extending from the perimeter 6 of the hole 2 towards the perimeter 10 of the damper. The slits 4 shown extend through the backing layer 8.

Figure 2:
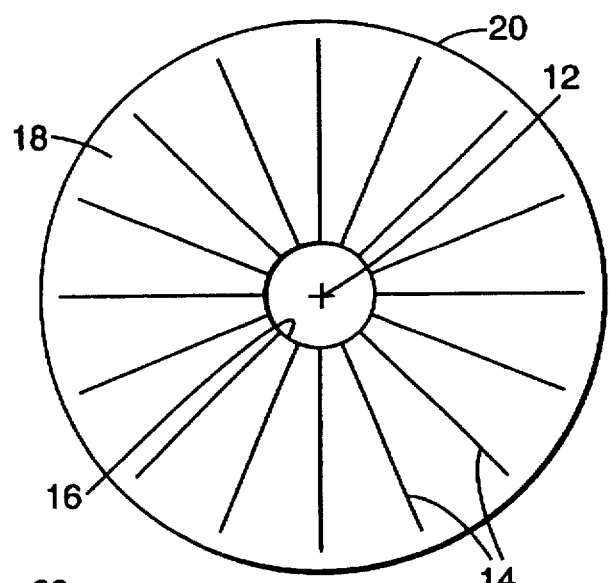
FIG. 2 illustrates a top plan view of another embodiment of a damper of the invention.

FIG. 2 illustrates a damper of the invention having a central circular hole 12 and sixteen slits 14 extending from the perimeter 16 of the hole 12 towards the perimeter 20 of the damper. The slits 14 shown extend through the backing layer 18 of the damper. The slits 14 of the damper of FIG. 2 are longer than those of the damper of FIG. 1.

Figure 3:
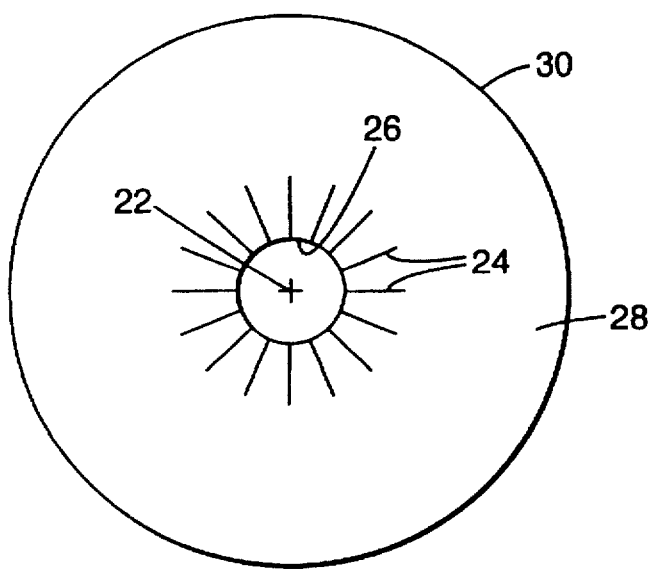
FIG. 3 illustrates a top plan view of a damper falling outside the scope of the invention.

FIG. 3 illustrates a damper of the present invention having a central circular hole 22 and sixteen slits 24 extending from the perimeter of the hole 26 towards the perimeter 30 of the damper. The slits 24 shown extend through the backing layer 28 of the damper. The slits 24 however are of insufficient length to provide the preferred slit vector length.

Figure 4:
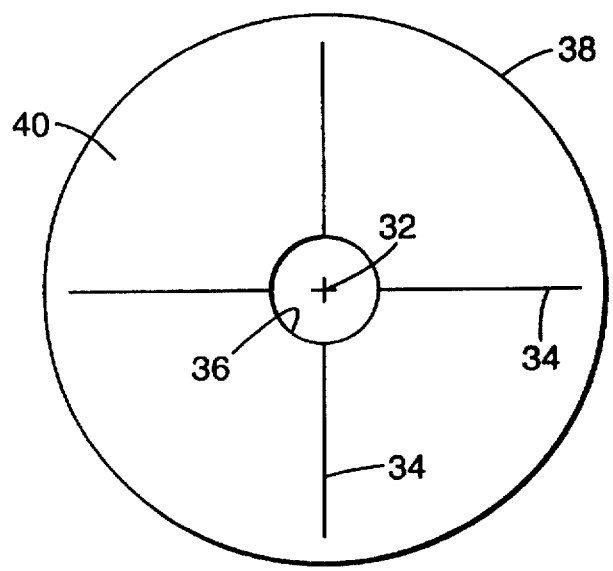
FIG. 4 illustrates a top plan view of another embodiment of a damper of the invention.

FIG. 4 illustrates a damper of the invention having a central circular hole 32 and four slits 34 extending from the perimeter 36 of the hole 32 towards the perimeter 38 of the damper. The slits 34 shown extend through the backing layer 40 of the damper.

Figure 5:
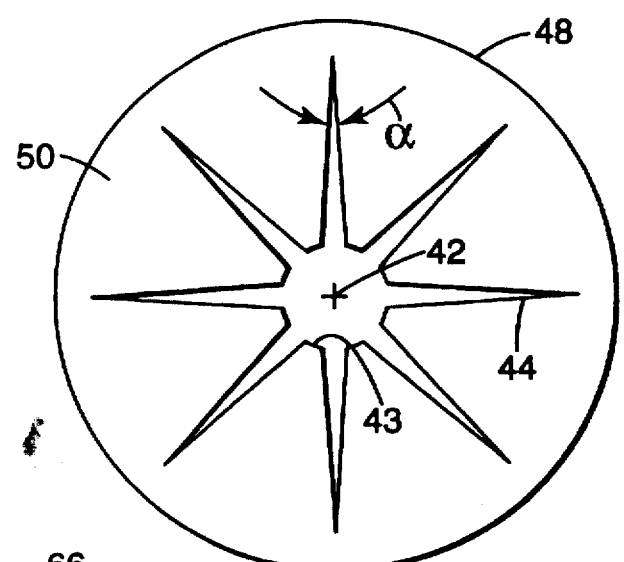
FIG. 5 illustrates a top plan view of another embodiment of a damper of the invention.

FIG. 5 illustrates a damper of the invention having a central circular hole 42 and eight somewhat triangular shaped cutouts 44 extending from the perimeter 43 of the hole 42 towards the perimeter 48 of the damper. The cutouts 44 shown extend through the backing layer 50 of the damper as well as the vibration damping material layer. Each cutout has an internal angle, $\alpha$, which is less than 90°.

Figure 6:
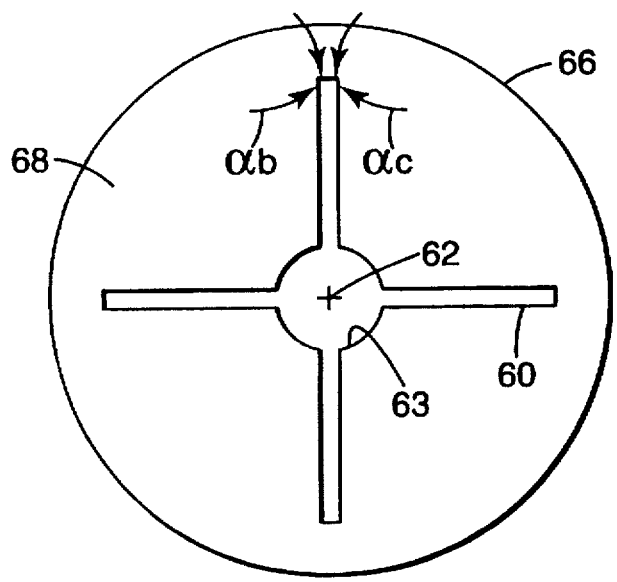
FIG. 6 illustrates a top plan view of another embodiment of a damper of the invention.

FIG. 6 illustrates a damper of the invention having a central circular hole 62 and four somewhat rectangular shaped cutouts 60 extending from the perimeter 63 of the hole 62 towards the perimeter 66 of the damper. The cutouts 60 shown extend through the backing layer 68 of the damper as well as the vibration damping material layer. Each cutout has two interior angles, $\alpha_b$ and $\alpha_c$, which are equal to 90°.

Figure 7:
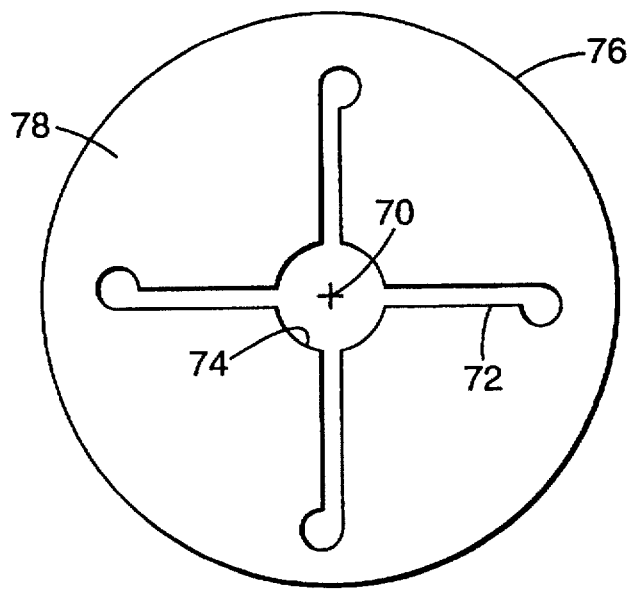
FIG. 7 illustrates a top plan view of a known damper.

FIG. 7 illustrates a known damper having a central circular hole 70 and four particular shaped cutouts 72 extending from the perimeter 74 of the hole 70 towards the perimeter 76 of the damper. The cutouts 72 do not have an internal angle less than or equal to 90°. The cutouts 72 shown extend through the backing layer 78 of the damper as well as the vibration damping material layer.

Figure 8:
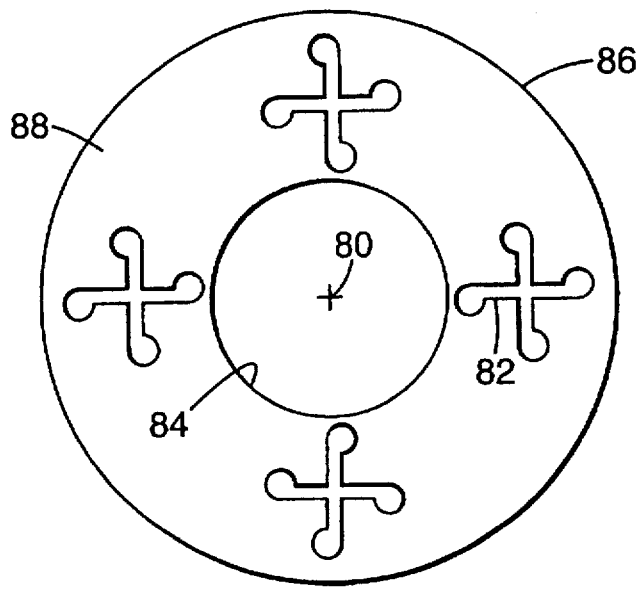
FIG. 8 illustrates a top plan view of another known damper.

FIG. 8 illustrates a known damper having a central circular hole 80 and four particular shaped cutouts 82 positioned between the perimeter 84 of the hole 80 and the perimeter 86 of the damper. The cutouts 82 shown extend through the backing layer 88 of the damper as well as the vibration damping material layer. None of the cutouts 82 have an internal angle less than or equal to 90°.

Figure 13:
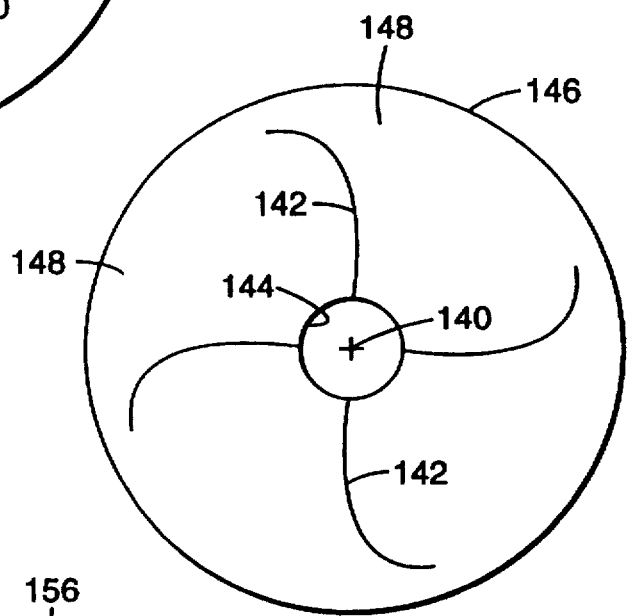
FIG. 13 illustrates a top plan view of another embodiment of the damper of the invention.

FIG. 13 illustrates a damper of the invention having a central circular hole 140 and four curved slits 142 extending from the perimeter 144 of the hole 140 towards the perimeter 146 of the damper. The slits 142 shown extend through the backing layer 148 of the damper.

Figure 23:
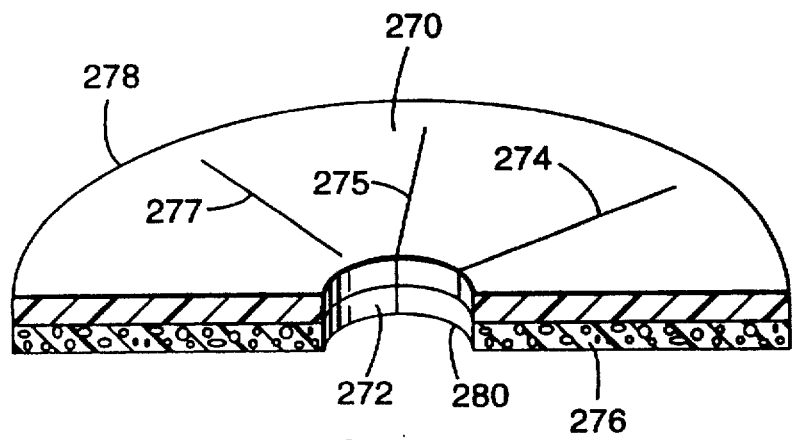
FIG. 23 illustrates a cross-section of another embodiment of the damper of the invention.

FIG. 23 illustrates a cross-section of a damper of the invention having a central circular hole 272 and three slits 274, 275, and 277 in the shown cross-section extending from the vicinity of the perimeter 280 of the hole 272 towards the perimeter 278 of the damper. The slit 274 shown extends through the backing layer 270 of the damper but not the vibration damping material layer 276. Slit 275 extends through both backing layer 270 and vibration damping material layer 276. Slit 277, which does not intersect with the perimeter 280 of the hole 272, extends through the backing layer 270 but not the vibration damping material layer 276.

Figure 24:
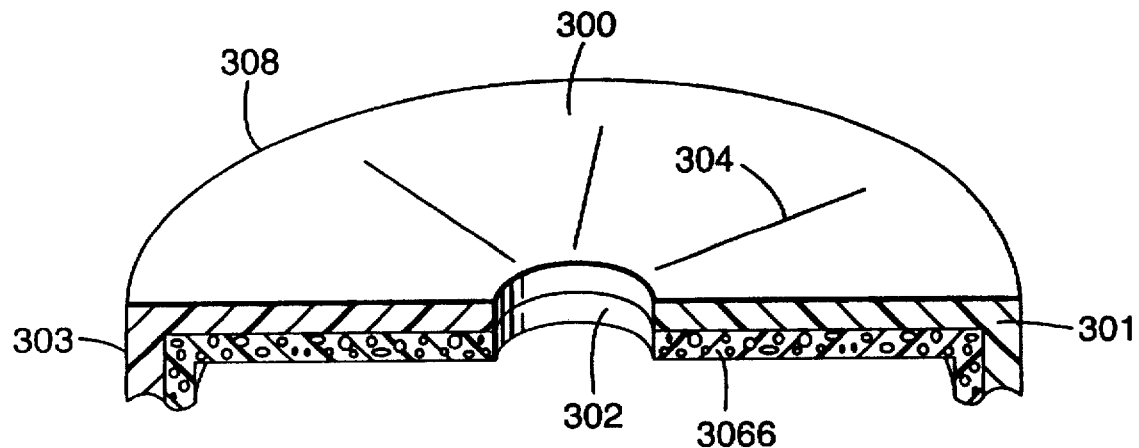
FIG. 24 illustrates a cross-section of another embodiment of the damper of the invention.

FIG. 24 illustrates a cross-section of a damper of the invention having a circular hole 302 and three slits 304 in the shown cross-section extending from the vicinity of the perimeter 305 of the hole 302 towards the perimeter 308 of the damper. Slit(s) 304 extend(s) through the backing layer 300 of the damper but not the vibration damping layer 306. Backing layer 300 has a rib edge 301.

Figure 25:
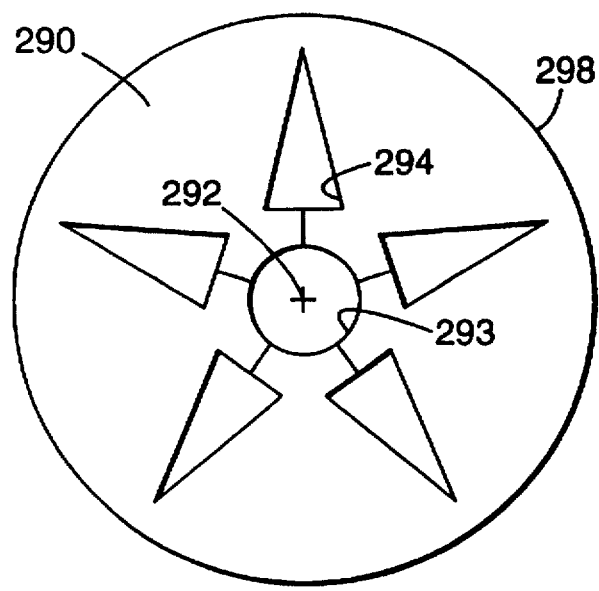
FIG. 25 illustrates a top plan view of another embodiment of the damper of the invention.

FIG. 25 illustrates a cross-section of a damper of the invention having a central circular hole 292 and five cutouts 294 positioned between the perimeter 293 of the hole 292 and the perimeter 298 of the damper extending through the backing 290 and the vibration damping material layer (not shown).

Method of Making the Constrained Layer Damper of the Invention

The article of the invention may be made by providing a standard constrained layer damper having a hole in the central portion thereof and subsequently providing the desired cutouts and/or slits in the damper by using any conventional cutting means. Another method would be to provide a damper without any central hole or any other holes and simultaneously providing the central hole and cutouts and/or slits by any conventional cutting means. Other methods of making the present invention are possible. The dampers of the invention are not to be limited to the method by which they are made.

Method of Using the Invention

The constrained layer damper of the invention is useful, for example, on a rotatable article such as a rotatable storage media or rotatable spacer article. The constrained layer damper can be attached to an outer surface of the rotatable storage media or spacer by any conventional method such as by the use of an adhesive.

EXAMPLES

The invention has been described with reference to various specific and preferred embodiments and will be further described by reference to the following detailed examples. It is understood, however, that there are many extensions, variations, and modifications on the basic theme of the present invention beyond that shown in the examples and detailed description, which are within the spirit and scope of the present invention. All parts, percentages, ratios, etc. in the examples and elsewhere throughout are by weight unless indicated otherwise.

General Preparation of the Constrained Layer Damper

Constrained layer dampers of the invention were prepared by laminating a 0.17 mm thick polyester film constraining layer (backing) to a 0.05 mm thick damping material (3M ISD-112, available from 3M Company, St. Paul, Minn.) using a 4.5 kg. rubber roller. This damping material is an acrylic polymer having a loss factor greater than 0.5 for a broad frequency range (+/−1000 Hz) at the desired test temperature (20° C./72° F.).

Annular rings with an outer diameter of 120 mm and an inner diameter of 15 mm were then cut from the polyester/acrylic damping material laminate. The annular rings were further altered with various shapes of cutouts and slits to produce the desired constrained layer dampers.

Testing of the Constrained Layer Damper

The constrained layer damper was hand laminated using a 4.5 kg. rubber roller, onto one surface of a 1.2 mm thick×120 mm diameter circular polycarbonate compact disk having a 15 mm diameter central hole to produce a damped disk.

The damped disk was then tested as follows:

On the surface of the disk opposite that to which the damper was laminated, a 3 mm×3 mm square of 0.3 mm thick cold rolled steel was adhered to the disk at a point 3 mm from the outer edge of the disk (i.e., the 120 mm diameter edge) using a cyanoacrylate adhesive (Pronto™ Brand Instant Adhesive CA-8, available from 3M Company). Using a C-clamp, the disk was secured at its center to a rigid table. The disk was then excited with an electromagnetic transducer (Electro 3030 HTB A) positioned directly above the adhered steel square but not in contact with it. The resulting acceleration was measured with an accelerometer (Endevco Model 22) at a point diametrically opposite to the excitation point and at 5 mm from the outer edge. The transfer function was calculated from the acceleration measurement using a Tektronix 2630 Fourier Analyzer. Each transfer function was the average of 100 measurements.

The measurement of the damping is determined by calculating the loss factor of the second, third, and fourth modes for the damped disk using the Half-Power Bandwidth Method, i.e., the width (Hz) of the resonant peak at 3 db below the resonant frequency of peak amplitude/the resonant frequency (Hz) at peak amplitude. The average of the second, third, and fourth modes is reported as the damped disk loss factor.

Examples 1–6 and Comparative Examples 1–2

Constrained layer dampers with a plurality of slits were tested for loss factor on disks and compared to the performance of a disk without a damper (Comparative Example 1), and a disk construction with a damper having no slits (Comparative Example 2).

Constrained layer dampers were prepared according to the General Preparation for Constrained Layer Dampers outlined hereinabove. Using a sharp razor and starting at the edge of the central hole, a plurality of equally spaced, radial slits were cut into the damper, penetrating both the damping layer and the constrained layer. The dampers with slits were then laminated to a polycarbonate disk and tested as outlined in the test procedure above.

The number of slits, the length of the slits, and the loss factor are reported in Table 1.

TABLE 1

| Example No. | No. of Slits | Slit Length (mm) | Loss Factor |
| --- | --- | --- | --- |
| Ex. 1 | 4 | 47.5 | 0.054 |
| Ex. 2 | 6 | 47.5 | 0.063 |
| Ex. 3 | 8 | 47.5 | 0.073 |
| Ex. 4 | 16 | 18 | 0.039 |
| Ex. 5 | 16 | 30 | 0.054 |
| Ex. 6 | 16 | 45 | 0.082 |
| Comp. Ex. 1 | N/A | N/A | 0.016 |
| Comp. Ex. 2 | 0 | 0 | 0.042 |

From the data in Table 1 it can be generally seen that the loss factor of the damped disk having a damper with slits is greater than a disk having a damper with no slits (Comp. Ex. 2). While the loss factor of Ex. 4 is slightly less than that of Comp. Ex. 2, nevertheless it is greater than that of a disk with no damper (Comp. Ex. 1) and illustrates that a preferred length of the slit is at least 50% of the length of the damper radius.

Examples 7–10 and Comparative Example 3

Constrained layer dampers with a plurality of cutouts (Examples 7–10) and a damper having cutouts of the shape and size of a commercially available disk damper (Comparative Example 3) were tested for loss factor.

Constrained layer dampers were prepared according to the General Preparation for Constrained Layer Dampers outlined hereinabove. Using a sharp razor and starting at the edge of the central hole and radiating outward, a plurality of equally spaced, cutouts were cut into the damper, penetrating both the damping layer and the constrained layer. The dampers with cutouts were then laminated to the polycarbonate disk and tested as outlined in the test procedure above.

The shape of the cutouts, the number of cutouts, the length of the cutouts, and the loss factor are reported in Table 2.

TABLE 2

| Example No. | Cutout Shape | No. of Cutouts | Cutout Length (mm) | Cutout Width (mm) | Loss Factor |
| --- | --- | --- | --- | --- | --- |
| Ex. 7 | triangular (similar to FIG. 5) | 8 | 42.5 | 4 | 0.050 |
| Ex. 8 | triangular | 12 | 42.5 | 4 | 0.053 |
| Ex. 9 | rectangular | 8 | 35.0 | 4 | 0.062 |
| Ex. 10 | rectangular (similar to FIG. 6) | 4 | 30.0 | 4 | 0.049 |
| Comp. Ex. 3 | rectangular ending in offset circles d = 8 mm) (similar to FIG. 7) | 4 | 30.0 | 4 | 0.041 |

From the data in Table 2 it can be generally seen that the loss factor of a damped disk having a damper with cutouts is greater than a disk having a damper with no cutouts (Comp. Ex. 2). It can also be seen that the damper having cutouts with no internal angle of 90° or less (Comp. Ex. 3) does not give improved damping over a damper with no cutouts (Comp. Ex. 2).

Examples 11–17

Constrained layer dampers with a plurality of cutouts of the same shape were tested for loss factor on disks.

Constrained layer dampers were prepared according to the General Preparation for Constrained Layer Dampers outlined hereinabove. Using a sharp razor and starting at the edge of the central hole and extending radially outward, a plurality of equally spaced, triangular shaped cutouts were cut into the damper, penetrating both the damping layer and the constrained layer. The dampers with cutouts were then laminated to a polycarbonate disk and tested as outlined in the test procedure above.

The number of triangles, the percent of the area of the damper removed, and the loss factor are reported in Table 3.

TABLE 3

| Example No. | No. of Triangles | % Area Removed | Loss Factor |
| --- | --- | --- | --- |
| Ex. 11 | 8 | 5.6 | 0.043 |
| Ex. 12 | 12 | 8.4 | 0.046 |
| Ex. 13 | 16 | 11.2 | 0.047 |
| Ex. 14 | 20 | 14.0 | 0.050 |
| Ex. 15 | 24 | 16.8 | 0.063 |
| Ex. 16 | 28 | 19.6 | 0.043 |
| Ex. 17 | 32 | 22.4 | 0.041 |

From the data in Table 3, it can be generally seen that it is preferable that less than about 20% to the area of the damper is removed. While the loss factor of Ex. 17 is slightly less than that of Comp. Ex. 2, it is none the less greater than that of a disk with no damper (Comp. Ex. 1) and thus has utility as a damper.

Examples 18–22

Constrained layer dampers with a plurality of cutouts having a rectangular portion or a rectangular portion terminating in a somewhat circular portion were tested for loss factor on disks.

Constrained layer dampers were prepared according to the General Preparation for Constrained Layer Dampers outlined hereinabove. Using a sharp razor and starting at the edge of the central hole and extending radially outward, eight equally spaced, 3 mm wide by 32 mm long rectangular shaped cutouts were cut into the damper, penetrating both the damping layer and the constrained layer. The damper with rectangular cutouts was then laminated to a polycarbonate disk and tested as outlined in the test procedure above. After testing, one of the rectangles was rounded at its end transforming it into a rectangular portion terminating in a somewhat circular portion. The damper was then tested again. This process was repeated until all eight rectangular portions terminated in a somewhat circular portion.

The number of rectangular portions terminating in a circular portion, and the loss factor are reported in Table 4.

TABLE 4

| Example No. | No. of Rectangular Portions Having Circular Portions At Their Ends | Loss Factor |
| --- | --- | --- |
| Ex. 18 | 0 | 0.062 |
| Ex. 19 | 2 | 0.058 |
| Ex. 20 | 4 | 0.054 |
| Ex. 21 | 6 | 0.051 |
| Ex. 22 | 8 | 0.049 |

From the data in Table 4, it can be generally seen that as the number of sharp angles (90° or less) decreases, the loss factor decreases.

Example 23

A constrained layer damper with a plurality of slits having a surface which extends over the edge of the disk to form an edge rib was tested for loss factor on disks.

A constrained layer damper was prepared according to the General Preparation for Constrained Layer Dampers outlined hereinabove with the exception that the annular ring had an outer diameter of 123 mm. Using a sharp razor and starting 2 mm from the edge of the central hole and extending radially outward to the perimeter of the damper, forty equally spaced slits were cut into the damper, penetrating both the damping layer and the backing. The damper with the slits was then laminated to a polycarbonate disk, the excess 1.5 mm past the edge was bent down to form an edge rib (similar to FIG. 24) and the damped disk was tested as outlined in the test procedure above.

The loss factor for Example 23 was 0.104. From this it can be generally seen that an edge rib, which increases the stiffness of the backing, gives increased damping.

The following detailed description and examples have been given for clarity of understanding only. No unnecessary limitations are to be understood therefrom. The invention is not limited to the exact details shown and described, for variations obvious to one skilled in the art will be included within the invention defined by the claims.

We claim:

1. A damped article comprising:
   (a) an article selected from the group consisting of rotatable storage mires and rotatable spacer articles:
   (b) a damper comprising:
      a construction comprising:
         a layer(s) of vibration damping material attached to one side of a backing wherein the backing has a Young's Modulus greater than that of the layer(s) of vibration damping material;
         wherein the construction has a hole passing through the center of the construction;
         wherein the construction has a perimeter and the hole has a perimeter;
         wherein the construction has at least one slit, each slit independently extending through the backing and optionally further extending through the vibration damping material layer(s), wherein for each slit only one of the following is true: (i) the slit intersects with the perimeter of the hole but not the perimeter of the construction (ii) the slit intersects with the perimeter of the construction but not the perimeter of the hole (iii) the slit intersects with neither the perimeter of the hole nor the perimeter of the construction, wherein the damper has improved vibration damping properties compared to an identical damper not having slit(s); wherein the damper is attached to an outer surface of the article.

2. A damped article comprising:
   (a) an article selected from the group consisting of rotatable storage articles and rotatable spacer articles:
   (b) a damper comprising:
      a construction comprising:
         a layer(s) of vibration damping material attached to one side of a backing wherein the backing has a Young's Modulus greater than that of the layer(s) of vibration damping material;
         wherein the construction has a hole passing through the center of the construction;
         wherein the construction has a perimeter and the hole has a perimeter;
         wherein the construction has at least four slits, each slit independently extending through the backing and optionally further extending through the vibration damping material layer(s), wherein for each slit only one of the following is true: (i) the slit intersects with the perimeter of the hole but not the perimeter of the construction (ii) the slit intersects with the perimeter of the construction but not the perimeter of the hole (iii) the slit intersects with neither the perimeter of the hole nor the perimeter of the construction.
         wherein each slit is of sufficient length and positioned such that each slit vector has a length at least 50% of the shortest distance from a point on the perimeter of the hole to a point on the perimeter of the construction.
         wherein the damper construction can be centrally positioned in a four quadrant grid defined by two intersecting perpendicular straight lines such that at least one separate slit vector is present in each of the four quadrants; wherein the damper is attached to an outer surface of the article.

3. The damped article of claim 2 wherein the construction has 8 to 64 slits.

4. The damped article of claim 2 wherein the construction has 20 to 64 slits.

5. The damped article of claim 2 wherein each of the slits are symmetrically positioned with respect to the hole.

6. The damped article of claim 2 wherein the slits are equidistantly positioned with respect to each other.

7. The damped article of claim 6 wherein the slits are symmetrically positioned with respect to the hole.

8. The damped article of claim 2 wherein the slits have shapes independently selected the group consisting of (i) straight line segments, (ii) curved line segments; (iii) combinations of straight line segments, (iv) combinations of curved line segments, and (v) combinations of straight line segment(s) and curved line segment(s).

9. The damped article of claim 8 wherein the slits are all straight line segments.

10. The damped article of claim 2 wherein the construction has a circular shape and the hole has a circular shape.

11. The damped article of claim 10 wherein the slits are straight line segments which each extend along a separate radius of the construction.

12. The damped article of claim 10 wherein the slits are positioned symmetrically about the hole of the construction.

13. The damped article of claim 10 wherein the slits are positioned equidistantly from each other.

14. The damped article of claim 2 wherein each slit is of sufficient length and positioned such that each slit vector has a length at least 75 percent of the shortest distance from a point on the perimeter of the hole to a point on the perimeter of the construction.

15. The damped article of claim 2 wherein each slit is of sufficient length and positioned such that each slit vector has a length at least 90 percent of the shortest distance from a point on the perimeter of the hole to a point on the perimeter of the construction.

16. The damped article of claim 2 wherein the backing comprises one or more layers selected from the group consisting of paper, metal, polymeric materials, fiber reinforced polymeric materials, and combinations thereof.

17. The damped article of claim 16 wherein the polymeric materials are selected from the group consisting of polystyrene, polyester, polyvinyl chloride, epoxy resin, polyurethane, polycarbonate, polyimide, polyethylene, and polypropylene.

18. The damped article of claim 2 wherein the backing has Young's Modulus of at least about $1 \times 10^8$ Pascals.

19. The damped article of claim 2 wherein the perimeter of the damper forms an angular ridge such that the ridge extends in a direction away from the backing and towards the damping material layer(s).

20. A damped article comprising:
(a) an article selected from the group consisting of rotatable storage articles and rotatable spacer articles:
(b) a damper comprising:
a construction comprising:
a layer(s) of vibration damping material attached to one side of a backing wherein the backing has a Young's Modulus greater than that of the layer(s) of vibration damping material;
wherein the construction has a perimeter;
wherein the construction has a hole passing through the center of the construction, wherein the perimeter of the hole is defined by the largest circle that can fit within the hole;
wherein at least one of (i) and (ii) is true: (i) the construction has at least one cutout therein, wherein each cutout independently extends through the backing and optionally through the vibration damping material layer(s), (ii) the construction has a combination of at least one cutout and at least one slit wherein each cutout independently extends through the backing and optionally further extends through the vibration damping material layer(s), and wherein each slit independently extends through the backing and optionally further extends through the vibration damping material layer(s);
wherein the damper has improved vibration damping properties compared to an identical damper not having slit(s) and cutout(s); wherein the damper is attached to an outer surface of the article.

21. A damped article comprising:
(a) an article selected from the group consisting of rotatable storage articles and rotatable spacer articles:
(b) a damper comprising:
a construction comprising:
a layer(s) of vibration damping material attached to one side of a backing wherein the backing has a Young's Modulus greater than that of the layer(s) of vibration damping material;
wherein the construction has a perimeter;
wherein the construction has a hole passing through the center of the construction, wherein the perimeter of the hole is defined by the largest circle that can fit within the hole;
wherein at least one of (i) and (ii) is true: (i) the construction has at least four cutouts therein, wherein at least one cutout has an internal angle of 90° or less, wherein each cutout independently extends through the backing and optionally through the vibration damping material layer(s), (ii) the construction has a combination of cutout(s) and slit(s) such that at least one cutout is present and at least one slit present and the total number of slit(s) and cutout(s) combined is at least four, wherein each cutout independently extends through the backing and optionally further extends through the vibration damping material layer(s), and wherein each slit independently extends through the backing and optionally further extends through the vibration damping material layer(s);
wherein each cutout is of sufficient dimensions and positioned such that each cutout vector has a length at least 50% of the shortest distance from a point on the perimeter of the hole to a point on the perimeter of the construction,
wherein each slit is of sufficient length and positioned such that each slit vector has a length at least 50% of the shortest distance from a point on the perimeter of the hole to a point on the perimeter of the construction,
wherein the damper construction can be centrally positioned in a four quadrant grid defined by two perpendicular intersecting straight lines such that at least one of the following is present in each quadrant: (i) a slit vector; (ii) a cutout vector; wherein the damper is attached to an outer surface of the article.

22. The damped article of claim 21 wherein for each slit one of the following is true: (i) the slit intersects with the perimeter of the hole, (ii) the slit intersects with the perimeter of the construction,(iii) the slits intersects with neither the perimeter of the hole nor the perimeter of the construction, and
wherein for each cutout only one of the following is true:
(i) the cutout intersects with the perimeter of the hole,
(ii) the cutout intersects with the perimeter of the construction, (iii) the cutout intersects with neither the perimeter of the hole nor the perimeter of the construction.

23. The damped article of claim 21 wherein the construction has a total number of slits plus cutouts of 4 to 32 cutouts.

24. The damped article of claim 21 wherein the construction has a total number of slits plus cutouts of 8 to 16.

25. The damped article of claim 21 wherein each of the cutouts and slits, if present, are all symmetrically positioned with respect to the hole.

26. The damped article of claim 21 wherein the cutouts and slits, if present, are all equidistantly positioned with respect to each other.

27. The damped article of claim 21 wherein the cutouts and slits if present are all symmetrically positioned with respect to the hole.

28. The damped article of claim 21 wherein the cutouts have shapes independently selected from the group consisting of rectangular shaped cutouts, triangular shaped cutouts, and crescent shaped cutouts.

29. The damped article of claim 21 wherein the construction has a circular shape and the hole has a circular shape.

30. The damped article of claim 21 wherein the cutouts are positioned symmetrically about the hole of the construction.

31. The damped article of claim 21 wherein the cutouts are positioned equidistantly from each other.

32. The damped article of claim 21 wherein each cutout is of sufficient dimensions and positioned such that the cutout vector extends at least 75% of the distance from the perimeter of the hole to the perimeter of the construction.

33. The damped article of claim 21 wherein each cutout is of sufficient dimensions and positioned such that the cutout vector extends at least 90% of the distance from the perimeter of the hole to the perimeter of the construction.

34. The damped article of claim 21 wherein the backing comprises one or more layers selected from the group consisting of paper, metal, polymeric materials, fiber-reinforced polymeric materials, and combinations thereof.

35. The damped article of claim 21 wherein the polymeric materials are selected from the group consisting of polystyrene, polyester, polyvinyl chloride, polyurethane, polycarbonate, polyimide, polyethylene, and polypropylene.

36. The damped article of claim 21 wherein the perimeter of the damper forms an angular ridge such that the ridge extends in a direction away from the backing and towards the damping material layer(s).

* * * * *